United States Patent [19]

Berberick et al.

[11] Patent Number: 5,154,992
[45] Date of Patent: Oct. 13, 1992

[54] ELECTROLYTE FOR LITHIUM-MANGANESE OXIDE CELLS AND THE LIKE

[75] Inventors: David R. Berberick, Maple Grove; John W. Cretzmeyer, Richfield; Donald R. Merritt, Brookyln Center; Paul M. Skarstad, Plymouth; Douglas J. Weiss, Coon Rapids, all of Minn.

[73] Assignee: Medtronic, Inc., Minneapolis, Minn.

[21] Appl. No.: 566,010

[22] Filed: Aug. 10, 1990

[51] Int. Cl.$^5$ .................. H01M 6/14; H01M 6/16
[52] U.S. Cl. .................... 429/197; 429/194; 429/198
[58] Field of Search ............ 429/197, 198, 194

[56] References Cited

U.S. PATENT DOCUMENTS

| | | | |
|---|---|---|---|
| 4,133,856 | 1/1979 | Ikeda et al. | 429/224 |
| 4,166,888 | 9/1979 | Rao et al. | 429/197 |
| 4,279,972 | 7/1981 | Moses | 429/50 |
| 4,310,609 | 1/1982 | Liang et al. | 429/194 |
| 4,328,288 | 5/1982 | Taylor | 429/48 |
| 4,391,729 | 7/1983 | Liang et al. | 252/182.1 |
| 4,804,595 | 2/1989 | Bakos et al. | 429/197 |
| 4,830,940 | 5/1989 | Keister et al. | 429/194 |

FOREIGN PATENT DOCUMENTS

| | | |
|---|---|---|
| 241644A2 | 10/1987 | European Pat. Off. |
| 329271A1 | 8/1989 | European Pat. Off. |
| 2801160C2 | 7/1978 | Fed. Rep. of Germany |
| 2926666A1 | 5/1980 | Fed. Rep. of Germany |
| 2135814 | 9/1984 | United Kingdom |

Primary Examiner—Anthony McFarlane
Assistant Examiner—Nhat Phan
Attorney, Agent, or Firm—Daniel W. Latham; Harold R. Patton

[57] ABSTRACT

An improved electrolyte for electrochemical cells including as a cosolvent for the cell electrolyte salt an amount of diglyme; ethyl diglyme; ethyl glyme; triglyme, tetraglyme and higher glymes; dimethoxymethane; 1,2-dimethoxypropane; dimethoxy THF or mixtures thereof.

11 Claims, 11 Drawing Sheets

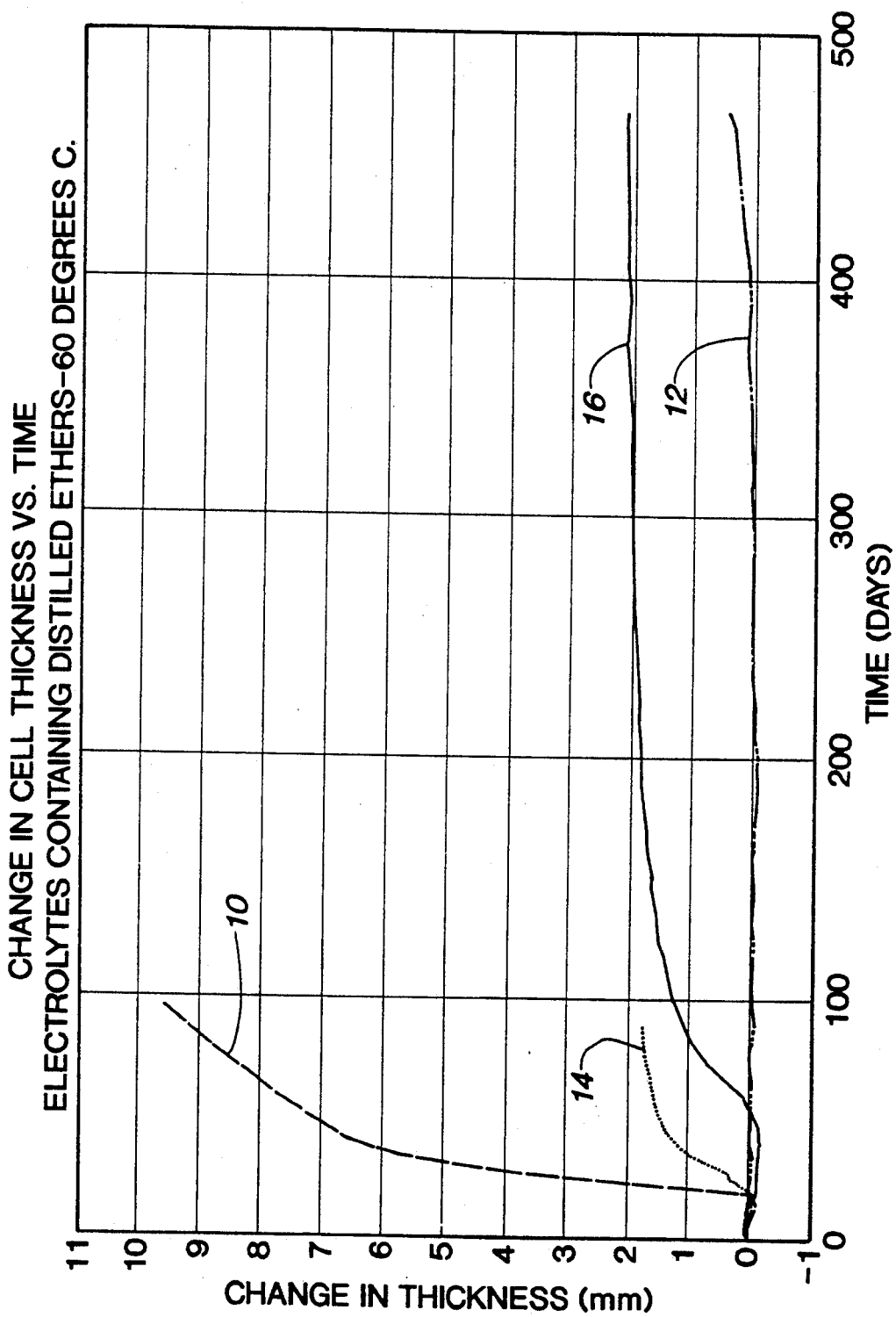

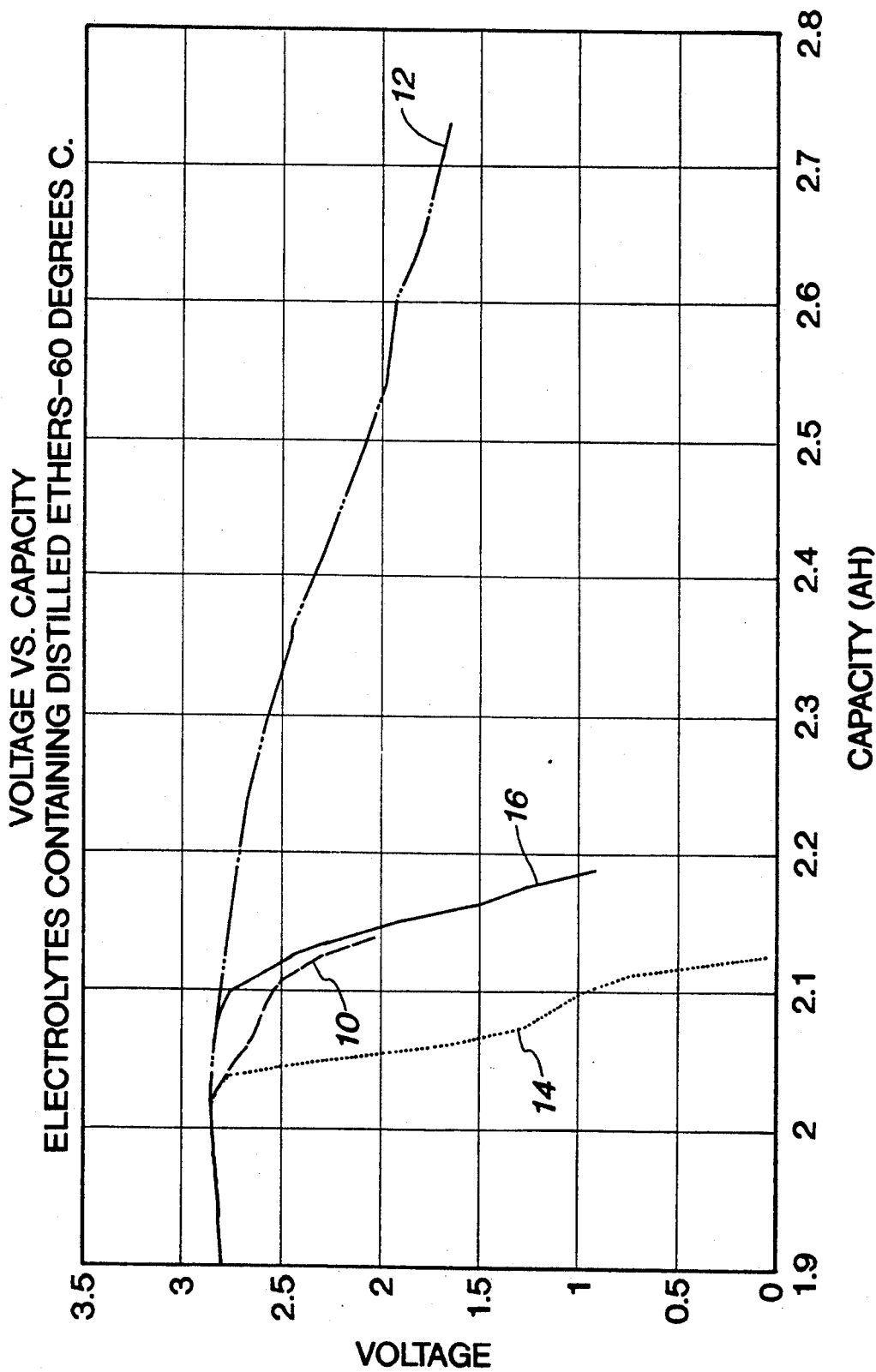

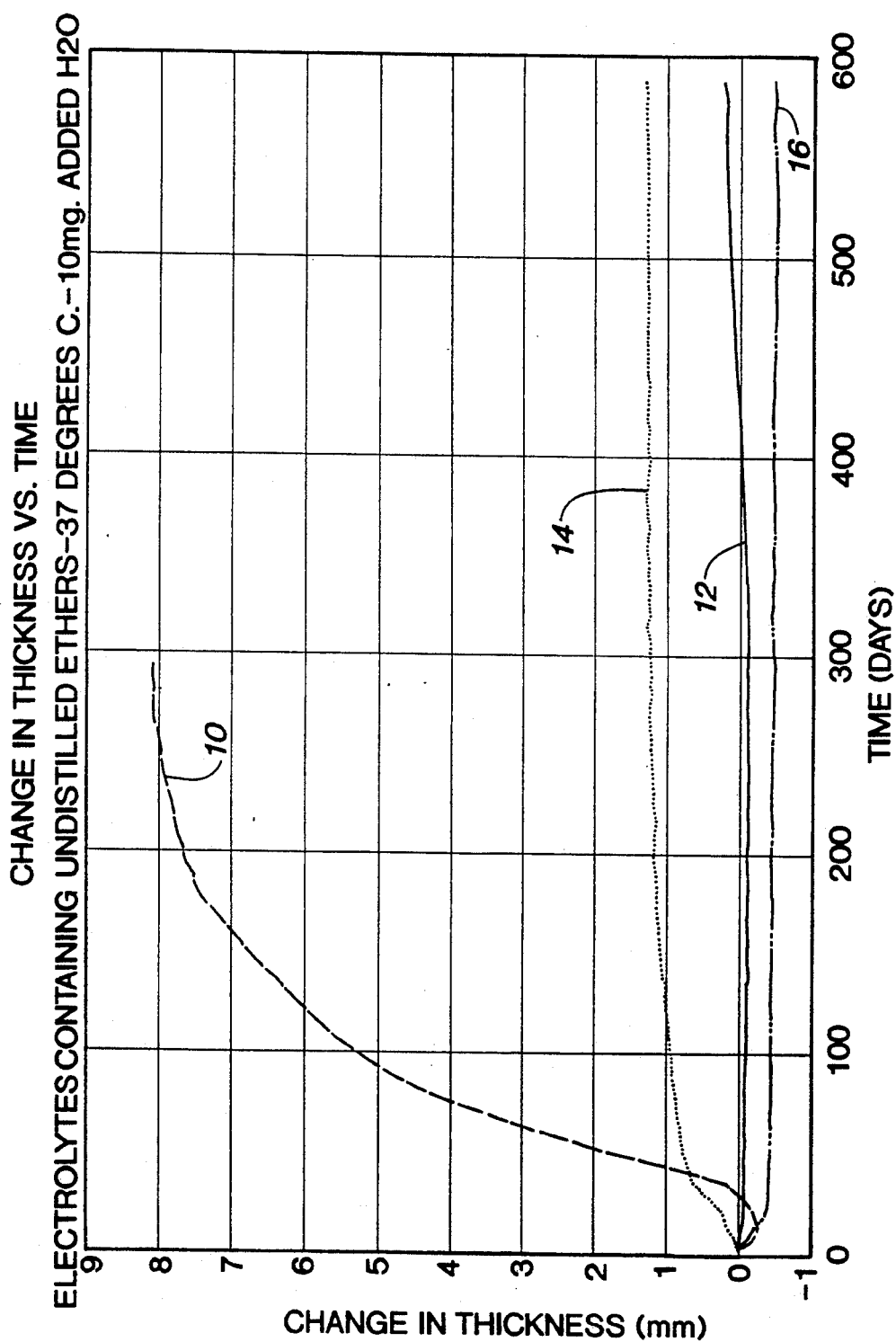

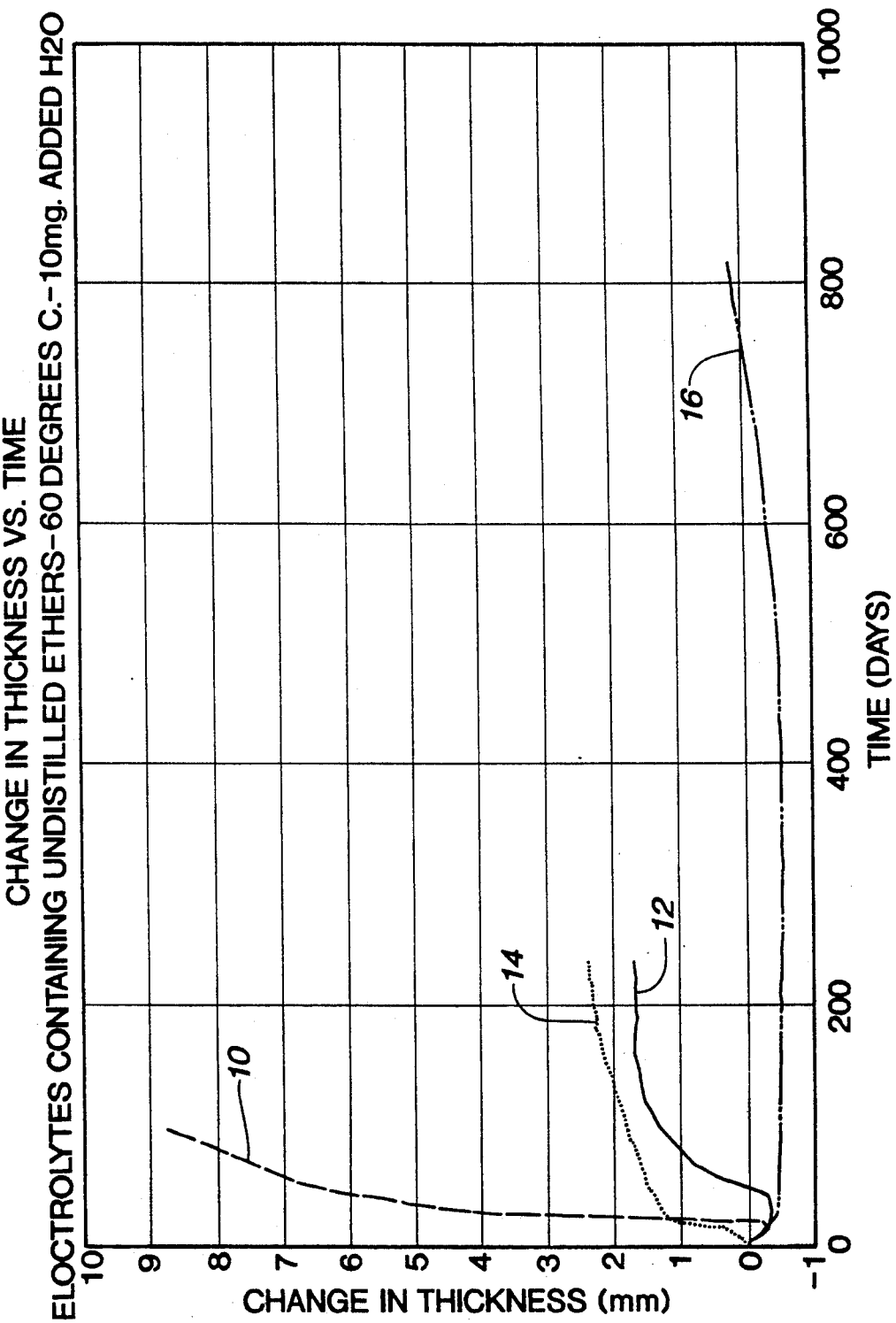

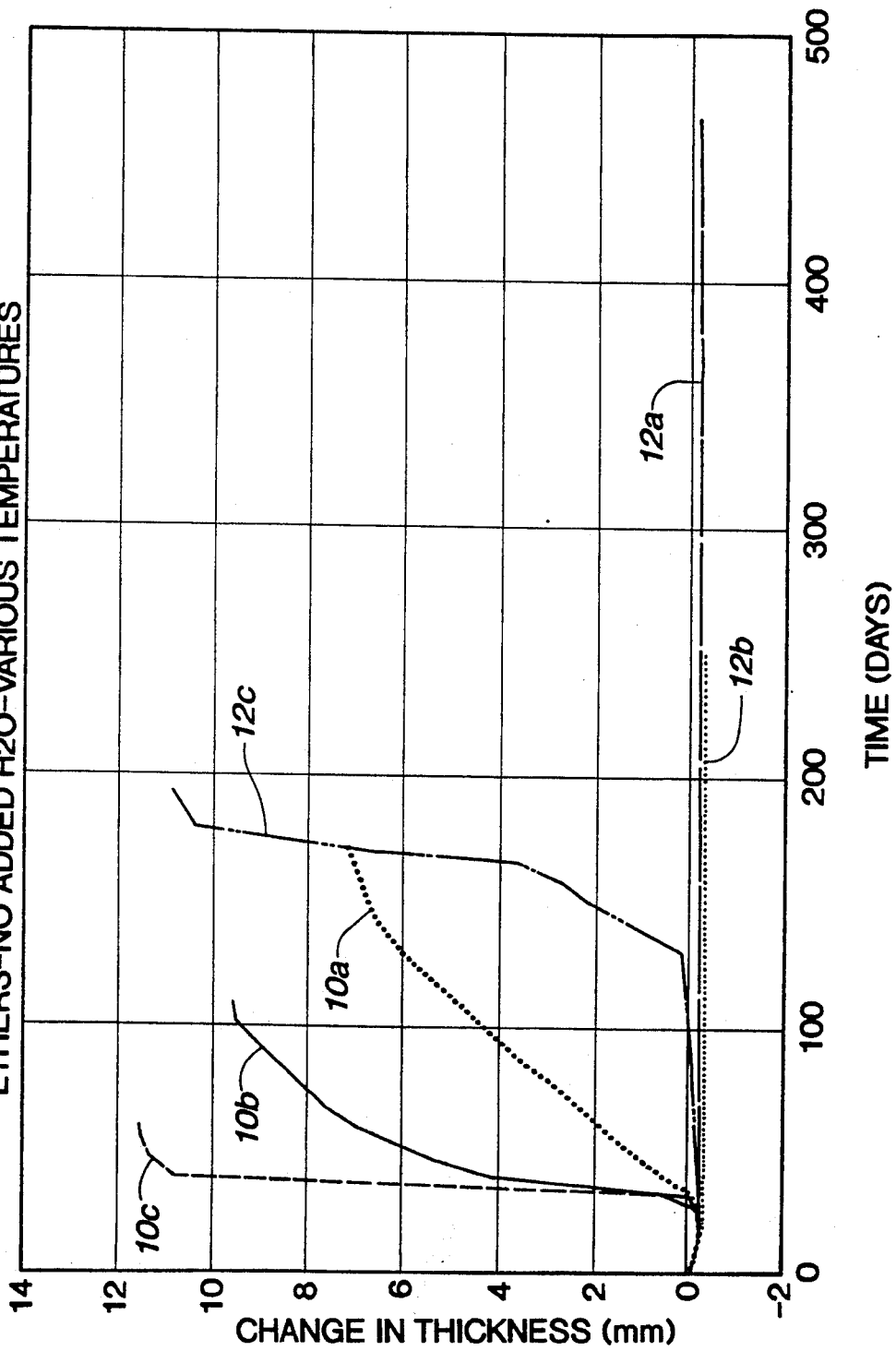

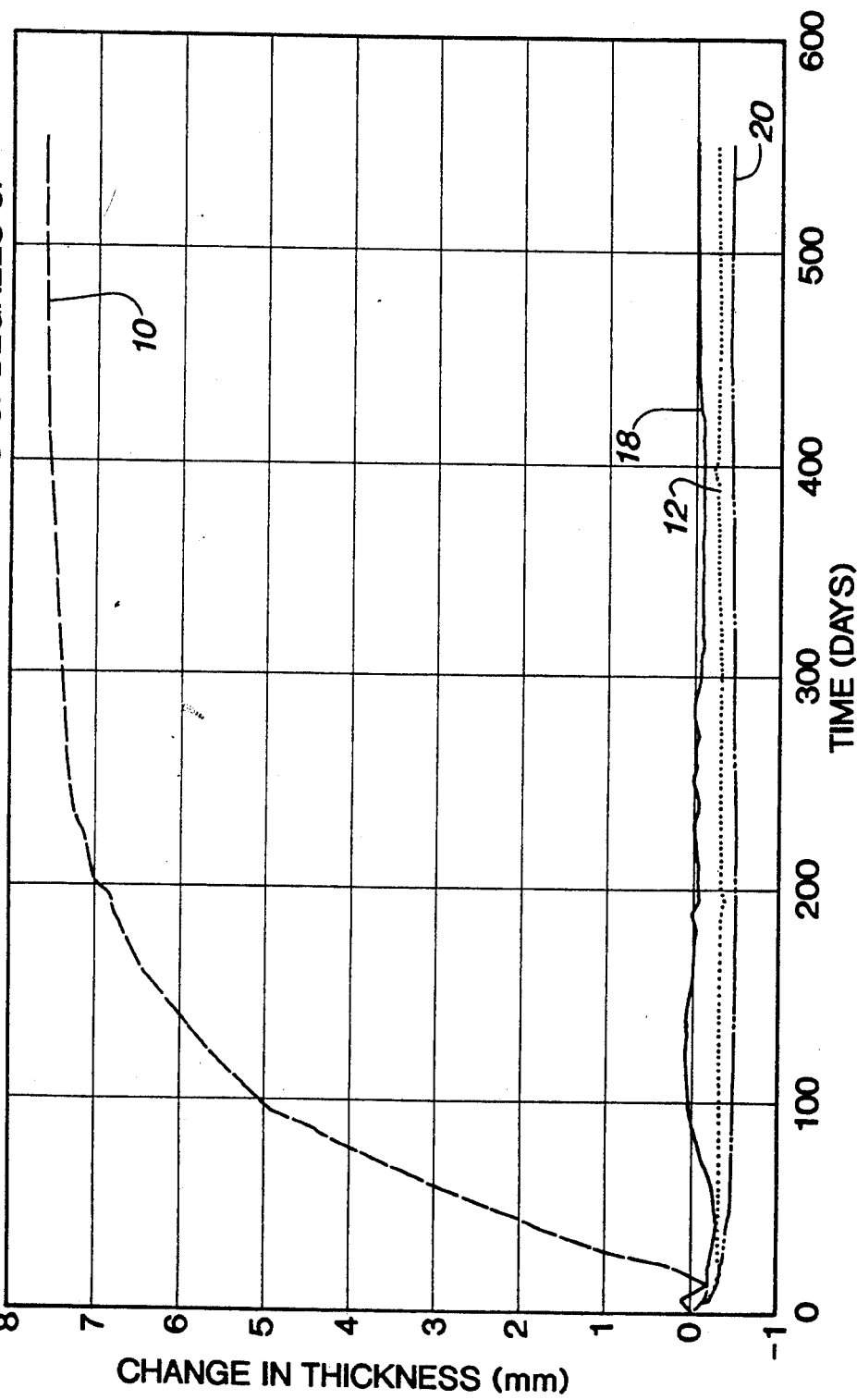

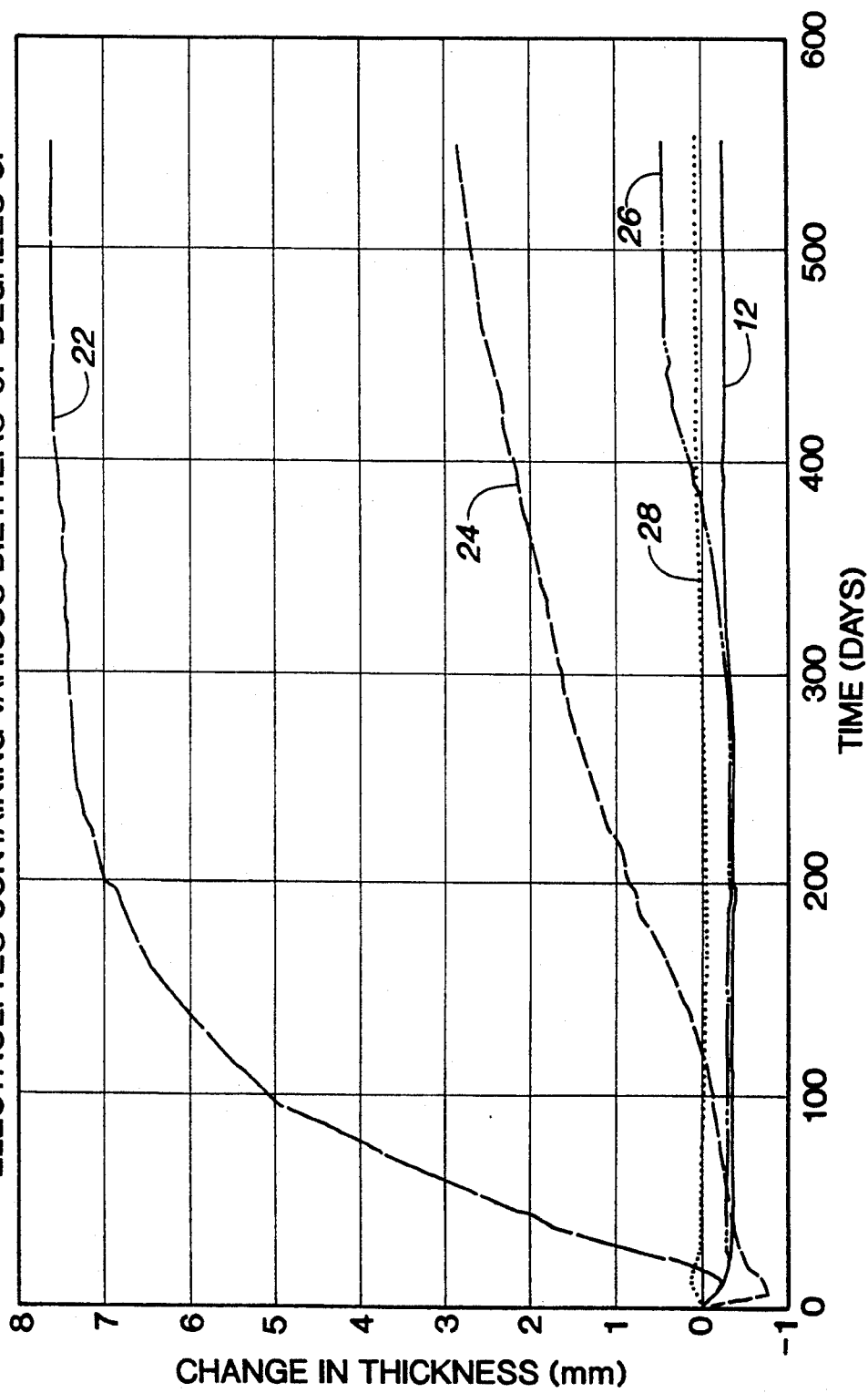

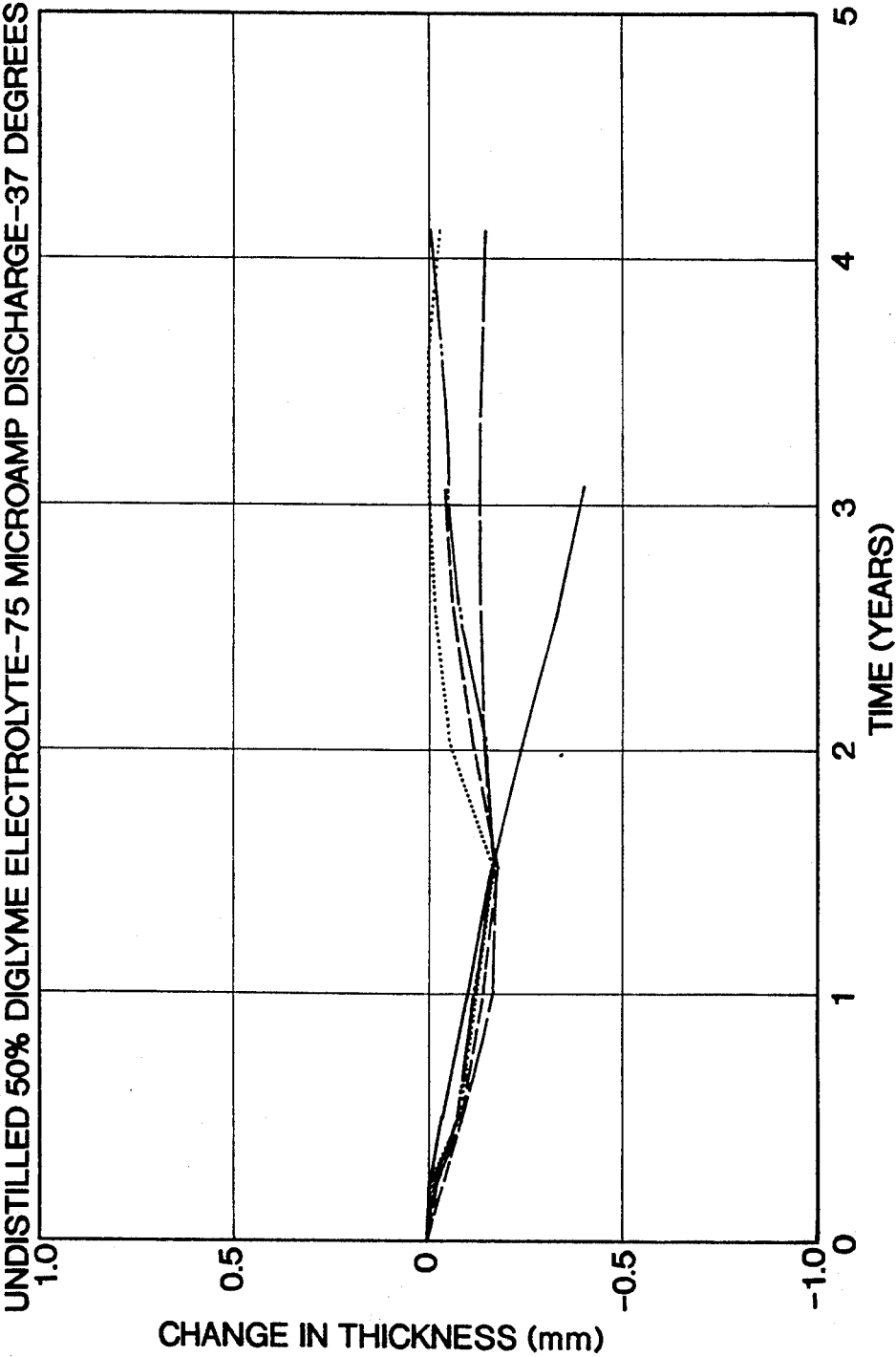

ELECTROLYTE FOR LITHIUM-MANGANESE OXIDE CELLS AND THE LIKE

TECHNICAL BACKGROUND

This invention relates to an improved electrolyte for non-aqueous electrochemical cells, specifically of the lithium/manganese dioxide type. However, it also relates more generally to a variety of such cells of differing chemistry which may be generally characterized as having active metal anodes, active porous solid cathodes, a separator between the electrodes and a non-aqueous liquid electrolyte permeating the separator and in contact with the anode and cathode. The electrolyte includes a salt of the anode metal and organic solvents therefor.

Such cells, in hermetically sealed condition, are particularly useful as power sources for medical devices. A preferred form for such cells in medical devices includes a flat sided metal container or can. Hermeticity is achieved by welding the can closed.

In discharging such cells the cell components are known to undergo a variety of chemical reactions which cause formation of various gases such as methane, resulting in swelling of the cell container. This is particularly disadvantageous in the sealed flat sided cells preferred for medical use. Moreover, these cells have been found to lack stability at elevated temperatures, such as autoclave temperatures, and thus have not been as useful as desired for various medical applications such as powering heart pacemakers and the like. Also, it has recently been discovered that such cells undergo on discharge the formation of corrosion products at least some of which form on the anode and detrimentally affect efficiency of operation.

It is a purpose of this invention to significantly reduce each of these aforenoted negative characteristics while maintaining and even improving the desirable characteristics of these cells and providing them with longer useful lives.

SUMMARY OF THE INVENTION

The invention accomplishes these purposes by including within the electrolyte as a new cosolvent an amount of diglyme; ethyl diglyme; ethyl glyme; triglyme, tetraglyme and higher glymes; dimethoxymethane; 1,2-dimethoxypropane; dimethoxy THF or mixtures thereof. In addition to a lower susceptibility to methane formation, diglyme, ethyl diglyme and the other glycol ethers set forth in accordance with this invention except dimethoxymethane are less volatile than glyme. That is, they have lower vapor pressure at a given temperature. Consequently, they are advantageous for medical applications in batteries used in devices that might be autoclaved.

PRIOR ART BACKGROUND

In so far as can be determined, ethyl diglyme or the other cosolvents mentioned above have not been suggested for use in cells of the aforementioned type for use as a cosolvent. Diglyme has been suggested in U.S. Pat. No. 4,279,972 issued to Moses on July 21, 1981, as a sole electrolyte solvent and such use has been referred to in U.S. Pat. No. 4,328,288, issued to Taylor on May 4, 1981. However, no suggestion has been found for using it as a cosolvent in such cells. Propylene carbonate (PC) is described as being a preferred solvent.

One problem with pure glycol ethers as solvents as described in the Moses Pat. No. 4,279,972 is that the solubility of many useful salts is low. This results in a low-conductivity electrolyte. This is illustrated by the values in the Table included below. For example, $LiClO_4$ is saturated at 0.07 M in pure diglyme with a conductivity of $3.1 \times 10^{-4}$ S/cm. The conductivity of 1M $LiClO_4$ in a mixture of diglyme and propylene carbonate (PC), 50:50 by volume, is $9.0 \times 10^{-3}$ S/cm, a factor of nearly 30 greater. A second problem with the use of pure diglyme as described in Moses is that there is a tendency toward methane evolution in $Li/MnO_2$ cells which increases dramatically with increasing diglyme concentration.

TABLE
CONDUCTIVITIES OF THE SYSTEM PC/DIGLYME/$LiClO_4$

| Solvent Blend | [$LiClO_4$] (M) | (S/cm × 10³) |
|---|---|---|
| pure PC | 2.41 (sat.) | 0.26 |
| 90 PC/10 diglyme | 3.08 (sat.) | 0.46 |
| 75 PC/25 diglyme | 2.85 (sat.) | 0.50 |
| 50 PC/50 diglyme | 3.17 (sat.) | 0.75 |
| 25 PC/75 diglyme | 1.28 (sat.) | 9.0 |
| 10 PC/90 diglyme | 0.84 (sat.) | 8.1 |
| pure diglyme | 0.07 (sat.) | 0.31 |
| pure PC | 0.25M | 3.5 |
| pure PC | 1.0M | 5.5 |
| 90 PC/10 diglyme | 0.25 | 4.5 |
| 90 PC/10 diglyme | 1.0 | 7.0 |
| 70 PC/30 diglyme | 0.25 | 4.9 |
| 70 PC/30 diglyme | 1.0 | 9.0 |
| 50 PC/50 diglyme | 0.25 | 5.0 |
| 50 PC/50 diglyme | 1.0 | 9.0 |
| 30 PC/70 diglyme | 0.25 | 4.9 |
| 30 PC/70 diglyme | 1.0 | 9.5 |
| 10 PC/90 diglyme | 0.25 | 3.4 |
| 10 PC/90 diglyme | 0.76 | 7.7 |

Problems that exist with the use of pure PC as solvent are twofold: 1) electrolytes made with pure PC as solvent fail to wet microporous polypropylene separators effectively and consequently, the separator becomes a high resistance barrier in the cell and 2) use of pure PC leads to increased $CO_2$ formation in undischarged batteries which contain small amounts of water, as do many non-aqueous $Li/MnO_2$ cells. This is probably the gas which the Moses patent purports to eliminate.

The standard electrolyte solvent blend PC/glyme 50:50 provides a solvent in which the salt is amply soluble, which permeates a microporous polypropylene separator, such as Celgard (a trade name of Celanese Corporation for their microporous non-woven polypropylene product) and in which $CO_2$ evolution can easily be eliminated. However, the propensity for methane formation with $MnO_2$ is still too high. Substitution of ethers of the invention maintains the good properties of PC/glyme and reduces the gassing via $CH_4$.

BRIEF DESCRIPTION OF THE DRAWINGS

FIGS. 1-11 are various graphs illustrating data taken in various experiments to illustrate effects of the invention.

DESCRIPTION OF THE PREFERRED EMBODIMENTS

Figure 1:
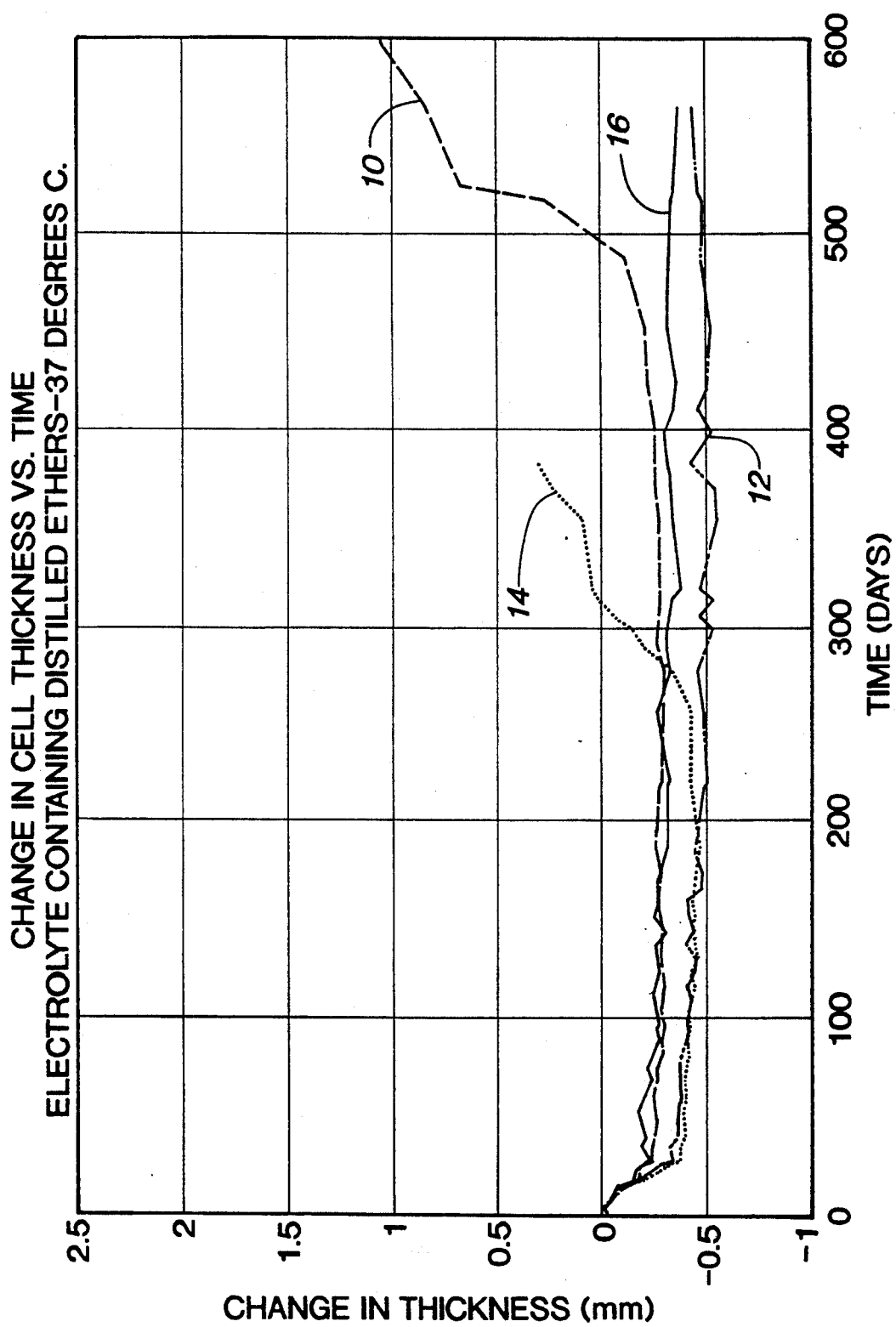

The general chemistry involved in the cells of concern herein is already known and has been described by others. For example, the following U.S. patents describe a variety of compositions for such cells: U.S. Pat.

Nos. 4,279,972; 4,328,288 (both of which are already referred to hereinabove); U.S. Pat. Nos. 4,133,856 issued to Ikeda et al on Jan. 9, 1979; U.S. Pat. No. 4,310,609 issued to Liang et al on Jan. 12, 1982; U.S. Pat. No. 4,391,729 issued to Liang et al on July 5, 1983 and U.S. Pat. No. 4,830,940 issued to Keister et al on May 16, 1989, all of which are incorporated herein by reference.

This invention is applicable to all the compositions and material combinations described in the prior art but is particularly useful in the lithium/manganese dioxide, lithium/$CF_x$ and lithium/silver vanadium oxide type cells having an electrolyte formed by dissolving lithium perchlorate ($LiClO_4$ or $LiBF_4$ in the case of $LiCF_x$ cells) in propylene carbonate (PC) solvent and including in accordance with this invention an amount of diglyme, ethyl diglyme, ethyl glyme, triglyme, tetraglyme and higher glymes, dimethoxymethane, 1,2-dimethoxypropane, dimethoxy THF or mixtures thereof, as a cosolvent along with the PC solvent or the like.

An effective minimal amount of the cosolvent combination with PC or other solvent will comprise enough solvent mixture as to provide a liquid electrolyte with dissolved salt which permeates the cell separator. Such a minimal amount of cosolvent from a practical standpoint has been found to be about 10% by weight relative to the other solvent used. However, it is to be understood that this is not critical and any amount greater than zero percent by weight will provide some advantages of the invention. Likewise, there is no critical amount as to an upper limit, it being understood that any amount less than 100% cosolvent will accomplish some of the desirable aspects of the invention more or less. Again, from the practical standpoint, a useful upper limit has been found to be about 60%–75% by weight for practical purposes. Preferred ranges are: 30–50% cosolvent, (as low as about 10% being acceptable) balance solvent. A preferred amount is about 40% cosolvent, balance solvent.

In its more general aspects, the invention is applicable to cells in which the anode comprises any active metal above hydrogen in the EMF series, preferably an alkali or alkaline earth metal or aluminum, most preferably lithium.

Typical cathode materials are solid and comprise as active components thereof metal oxides such as vanadium oxide ($V_6O_{13}$) silver vanadium oxide ($Ag_2V_4O_{11}$) and manganese dioxide, the latter being preferred, thermally treated electrolytic manganese dioxide being most preferred, and may also comprise carbon monofluoride ($CF_x$) and hybrids e.g., $CF_x+MnO_2$ and any other known active electrolytic components in combination, such as combinations of those above. By "solid" with respect to those cathodes, it is meant to describe and refer to the pressed porous solid cathodes as are already known. Such cathodes are typically made by mixing one or more of the active components, with carbon and poly (tetrafluorethylene) and pressing them to form a porous solid structure.

The separator is preferably microporous polypropylene bonded to a non-woven polypropylene substrate such as that provided by Celanese Corporation under the tradename CELGARD. However, non-woven polypropylene or other separator materials i.e., pressed fibers, may be used.

The non-aqueous electrolyte will be comprised of a salt of the anode metal having complex anions when dissolved in an organic solvent(s) and the cosolvent(s) of the invention. A preferred salt in the case of a lithium anode is lithium perchlorate. A preferred solvent/cosolvent is propylene carbonate with diglyme, ethyl diglyme or a mixture thereof.

Other electrolyte salts include but are not limited to: lithium trifluoroacetate, $LiPF_6$, $LiCF_3SO_3$, $LiBF_4$, $LiAsF_6$.

Other solvents include but are not limited to: dioxolane, dimethyl sulfoxide, sulfolane and gamma-butyrolactone.

In some instances, it may be useful to regard a mixture of diglyme and ethyl diglyme as constituting a cosolvent mixture to be used with propylene carbonate or the like.

The following examples illustrate various preferred embodiments. They are provided for illustrative purposes only and are included as a clarification of the invention and should not be considered as a limitation thereof. All parts are parts by weight unless otherwise indicated.

A. CELL CONSTRUCTION

The formation of methane was observed in cathode-limited cells of 2.7 Ah capacity. These were constructed in flat half round configured cases made of stainless steel 304L with external dimensions 5.2×3.0×0.6 cm. The cell consisted of a central lithium anode sandwiched between cathode pellets. The cathode consisted of 91.8 weight % of a thermally-treated electrolytic $MnO_2$ obtained from Mitsui Corporation, 5.0 weight % Shawninigan acetylene black and 3.2 weight % poly(tetrafluoroethylene). Each cell contains a total of 10.4 g of cathode material and 2.6–2.8 g of electrolyte. The area of the anode was 20 $cm^2$. Cathode pellets were vacuum-baked for 16 hours at 275° C. immediately before assembly in a dryroom maintained at less than about 1% relative humidity. The cases were made hermetic by welding the top in place.

After the cells had been discharged rapidly (0.2 mA/$cm^2$) to about 2 Ah at 37° C., the current was relaxed to about 0.004 mA/$cm^2$. Within a few weeks, the relatively large flat faces or sides of the cells began to bulge under pressure. Cells were punctured in a small vacuum chamber. On the basis of data taken by mass spectrometry, gas chromatography and infrared spectroscopy, it was concluded that the gas was methane.

Definition of terms:

1. Glyme—also known as methyl glyme; methyl monoglyme; monoglyme; 1,2-dimethoxyethane; 1,2-ethanediol dimethyl ether; ethylene glycol dimethyl ether. CAS # 110-71-4.
2. Diglyme—also known as methyl diglyme; 2-methoxyethyl ether; bis(2-methoxyethyl) ether; diethylene glycol dimethyl ether. CAS # 111-96-6.
3. Ethyl glyme—also known as ethyl monoglyme; 1,2-diethoxyethane; 1,2-ethanediol diethyl ether; ethylene glycol diethyl ether. CAS # 112-36-7
4. Ethyl diglyme—also known as 2-ethoxyethyl ether; bis(2-ethoxyethyl) ether; diethylene glycol diethyl ether; diethyl carbitol. CAS #112-36-7
5. Triglyme—also known as methyl triglyme; triethylene glycol dimethyl ether; 1,2 (2-methoxyethoxy) ethane. CAS # 112-49-2.
6. Tetraglyme—also known as tetraethylene glycol dimethyl ether; 2, 5, 8, 11, 14-pentaoxapentadecane. CAS # 143-24-8.

7. Dimethoxymethane—also known as formaldehyde dimethyl acetal; methylal. CAS #109-87-5.
8. 1,2-dimethoxypropane—also known as propylene glycol dimethyl ether. CAS #7778-85-0.
9. 2,5-dimethoxytetrahydrofuran—also known as dimethoxy THF; tetrahydro 2,5- dimethoxyfuran. CAS # 7778-85-0.

B. SPECIFIC EXAMPLES

An electrolyte widely used in the battery industry is comprised of 1.0 molar $LiClO_4$ in 50 volume % propylene carbonate/50 volume % glyme. The examples are taken from experiments designed to investigate factors which affect the reactions which lead to the formation of methane mentioned above. Thus, many of the cells have been constructed with electrolytes or tested under conditions which actually hasten or amplify the formation of methane. Such experimental constructions and conditions include high levels of ether, addition of water, or elevated temperature discharge.

EXAMPLE I

In this example, cells as described above were filled with electrolyte composed of 1.0 M $LiClO_4$ in 50 volume % distilled glycol ether where the glycol ether in each of several cells is methyl glyme, methyl diglyme, ethyl glyme, or ethyl diglyme. The cells also contained 1? mg. water which was added to the cathode elements prior to cell construction. The cells were discharged as described above at 37° C. As shown in FIG. 1, the flat sides of the cells initially pull in or contract during discharge due to the negative volume of the $Li/MnO_2$ reaction.

After about 300 days, the cell containing ethyl glyme 14 had swollen to its original thickness due to gas formation. See 10, 12, 14 and 16 in FIG. 1 respectively. After about 500 days, the methyl glyme cell 10 had swollen to its original thickness. After 570 days the cell capacity was depleted, and the cells containing ethyl diglyme 16 and methyl diglyme 12 had not increased in thickness.

EXAMPLE II

Figure 2:
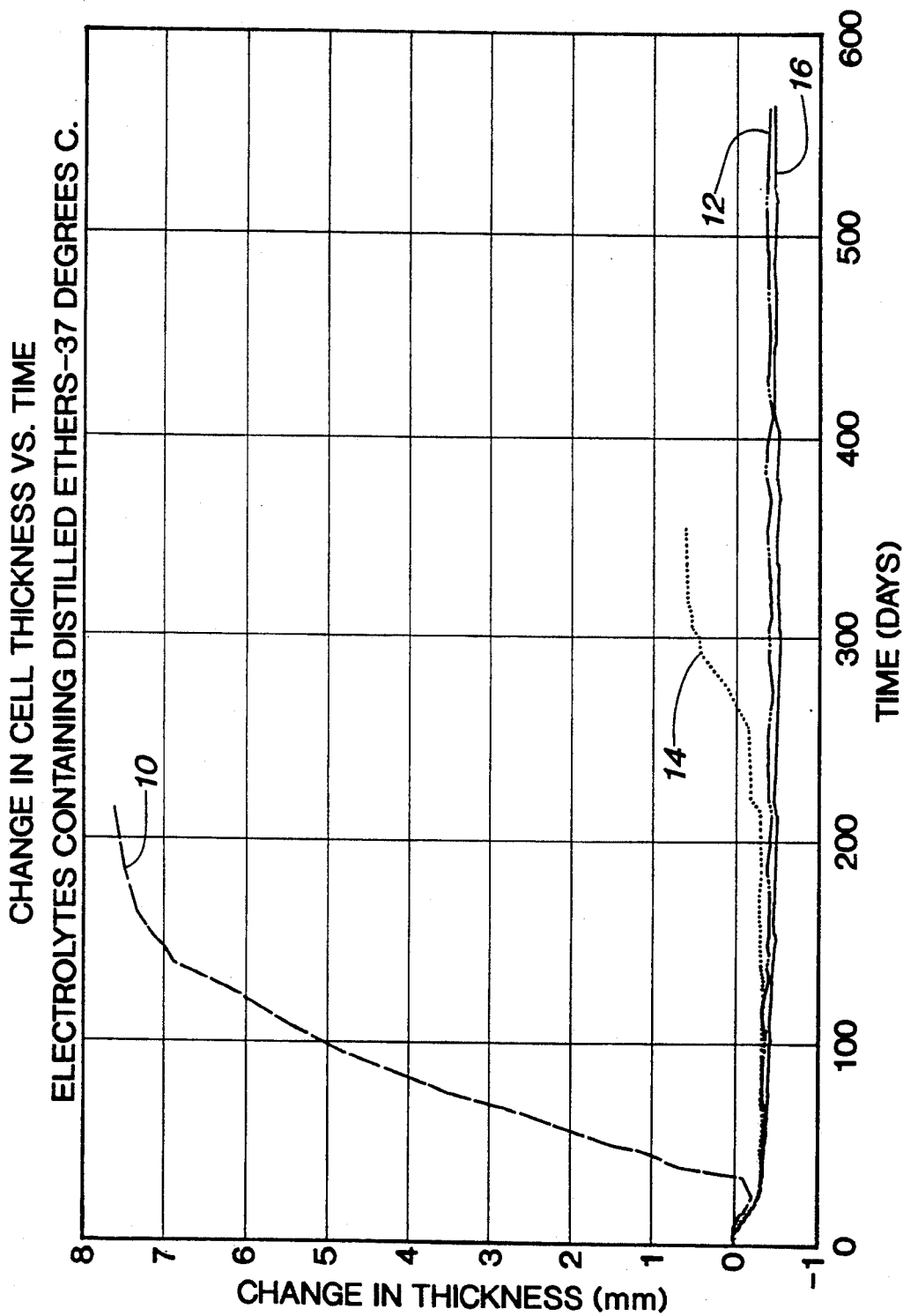

This example is the same as I, except the electrolytes are composed of 1.0 M $LiClO_4$ in 25 volume % PC/75% distilled glycol ether. As shown in FIG. 2, after 35 days, the methyl glyme cell 10 had swollen beyond its original thickness, followed by ethyl glyme 14 at 265 days. Once again, ethyl diglyme 16 and methyl diglyme 12 cells did not increase in thickness during the course of discharge 570 days even though the reaction with methyl and ethyl glyme is much accelerated over example I.

EXAMPLE III

Figure 3:
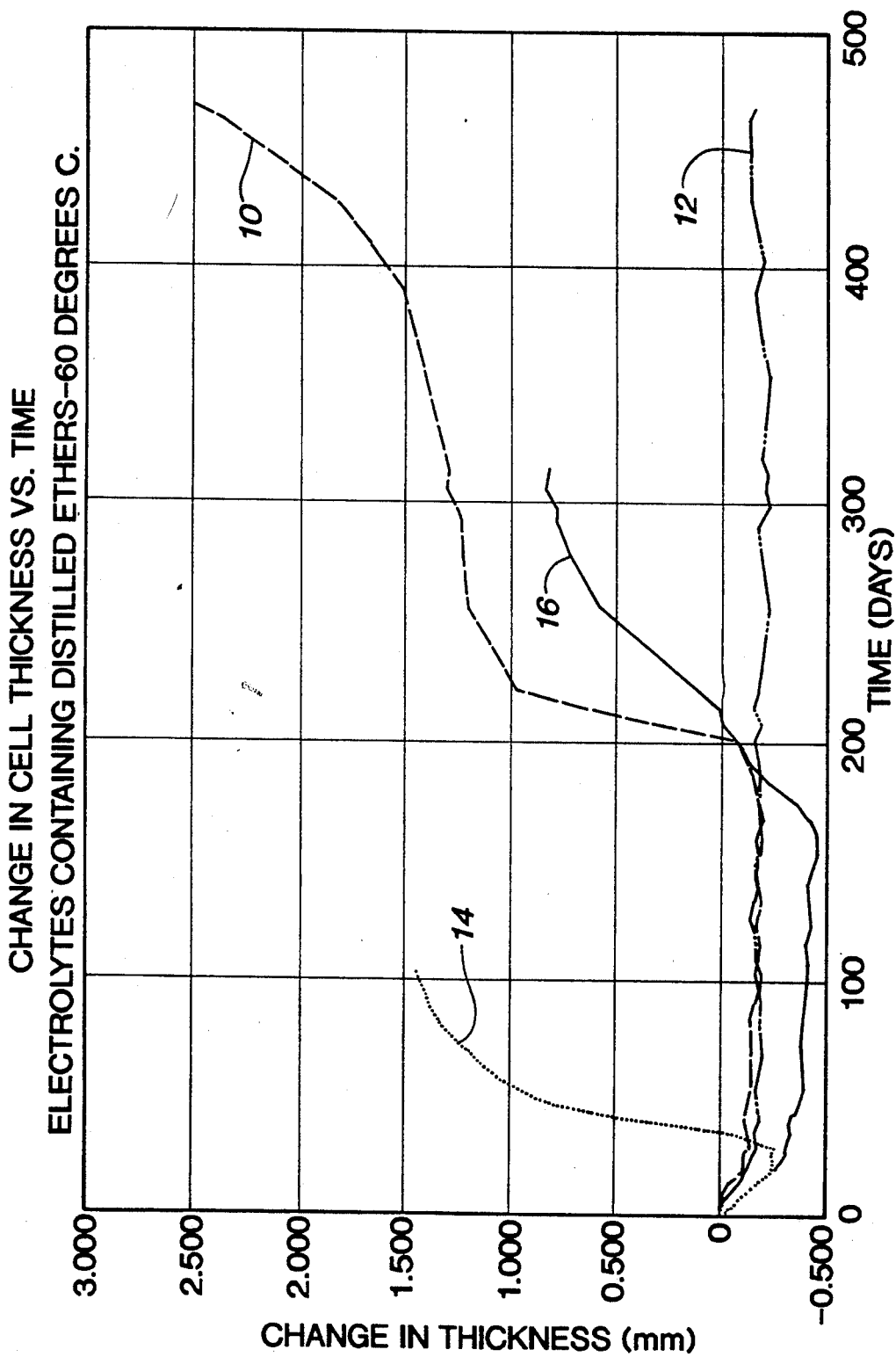

This example is the same as I, except the cells were discharged at 60° C. As shown in FIG. 3, the cell containing ethyl glyme 14 began swelling after 30 days, followed by methyl glyme 10 (202 days) and ethyl diglyme 16 (207 days). The cell containing methyl diglyme 12 did not swell throughout discharge (470 days).

EXAMPLE IV

This example is the same as I, except the cells were discharged at 60° C. As shown in FIG. 4, after 18 days, the cells containing methyl glyme 10 and ethyl glyme 14 began swelling followed by ethyl diglyme 16 (60 days) and finally methyl diglyme 12 (390 days).

FIG. 5 shows cell voltage vs. discharged capacity for the cells of this Example IV. The voltage for the ethyl glyme 14 cell begins to deteriorate after about 70%, as does the methyl glyme 10 cell's ethyl diglyme 16 cell begins deteriorating at about 75%. The methyl diglyme cell 12 shows very little voltage degradation to about 100% stoichiometric cell capacity.

EXAMPLE V

This example is analogous to Example II, with the exception that the glycol ethers are undistilled. As shown in FIG. 6 the cell containing ethyl glyme 14 began swelling immediately followed by methyl glyme 10 (35 days) and ethyl diglyme 16 (400 days). The methyl diglyme cell 12 did not swell over 590 days.

EXAMPLE VI

This example is the same as V except the cells were discharged at 60° C. As shown in FIG. 7, the ethyl glyme cell 14 began swelling immediately followed by methyl glyme 10 (18 days), ethyl diglyme 16 (60 days) and methyl diglyme 12 (750 days).

EXAMPLE VII

In this example, cells as described above were filled with electrolyte composed of 1.0M $LiClO_4$ in 25 volume % propylene carbonate (PC)/75 volume % undistilled glycol ether where the glycol ether is methyl glyme or methyl diglyme. The cells contained no added water. The cells were discharged as described above at 37°, 60° or 100° C. The results in FIG. 8 shows the cells containing methyl diglyme ($12a/37°$ C., $12b/60°$ C. and $12c/100°$ C.) do not swell at or below 60° C. over the course of discharge, whereas cells containing methyl glyme ($10a/37°$ C., $10b/60°$ C. and $10c/100°$ C.) do swell under the same conditions.

EXAMPLE VIII

In this example, cells as described above were filled with electrolyte composed of 1.0M $LiClO_4$ in 25 volume % propylene carbonate (PC)/75 volume % undistilled glycol ether where the glycol ether is methyl glyme, methyl diglyme, triglyme, or tetraglyme. The cells also contained 10 mg. water which was added to the cathode elements prior to cell construction. The cells were discharged as described above at 37° C. FIG. 9 shows that only the cells containing methyl glyme 10 swelled under these conditions; the methyl diglyme 12, triglyme 18 and tetraglyme 20 cells did not.

EXAMPLE IX

In this example, cells as described above were filled with electrolyte composed of 1.0 M $LiClO_4$ in 25 volume % propylene carbonate (PC)/75 volume % undistilled glycol ether where the glycol ether is dimethyoxyethane, dimethoxymethane, 1,2-dimethoxypropane, dimethoxy THF, or methyl diglyme. The cells also contained 10 mg. water which was added to the cathode elements prior to cell construction. The cells were discharged as described above at 37° C. As seen in FIG. 10, after a short time, the cell with dimethoxyethane 22 began swelling followed by the dimethoxymethane 24 (390 days) and dimethoxypropane 26 cell. The cells containing dimethoxy THF 28 and diglyme 12 did not swell throughout discharge (550 days) as shown in FIG. 10.

EXAMPLE X

In this example, several cells as described above were filled with electrolyte composed of 1.0M $LiClO_4$ in 50 volume % PC/50 volume % methyl diglyme. No water was added, and the cells were discharged at 75 microamperes at 37° C. Even after over four years of discharge, all the cells are at or below their initial thicknesses as shown in FIG. 11.

While preferred embodiments have been described in detail, this has not been done for purposes of limitation but by way of illustration. The invention is intended to be defined by the following claims:

What is claimed is:

1. In a hermetically sealed non-aqueous electrochemical cell including an active metal anode, a porous solid cathode having a cathode material selected from the group consisting of $MnO_2$, silver vanadium oxide, and $V_6O_{13}$, a separator between the anode and cathode and a liquid electrolyte wetting the separator and in contact with the anode and cathode, wherein the electrolyte comprises a salt of the anode metal dissolved in an organic solvent, the improvement comprising the addition as a cosolvent with the solvent, of a quantity of cosolvent selected from the group consisting of diglyme, ethyl diglyme, ethylglyme, triglyme, tetraglyme, dimethoxymethane, 1,2-dimethoxypropane, 2,5-dimethoxytetrahydrofuran and mixtures thereof.

2. The cell of claim 1 in which the solvent/cosolvent is a diglyme/ethyl diglyme mixture or an ethyl diglyme/diglyme mixture.

3. The cell of claim 1 in which the anode comprises lithium.

4. The cell of claim 3 in which the solvent is propylene carbonate.

5. The cell of claim 4 in which the salt is lithium perchlorate.

6. The cell of claim 1 in which the relative amounts of cosolvent and solvent by weight percentage range from about 10% cosolvent, balance solvent, to about 75% cosolvent, balance solvent.

7. The cell of claim 1 in which the cosolvent comprises diglyme.

8. The cell of claim 1 in which the cosolvent comprises ethyl diglyme.

9. The cell of claim 1 in which the anode comprises lithium, the cathode comprises manganese dioxide, the electrolyte salt comprises lithium perchlorate and the solvent comprises propylene carbonate.

10. The cell of claim 1 in which the cathode also comprises $CF_x$.

11. The cell of claim 1 in which the cathode comprises a hybrid including $CF_x$, $MnO_2$, $V_6O_{13}$, $Ag_2V_4O_{11}$.

* * * * *